US008756608B2

(12) United States Patent  
Elnozahy et al.

(10) Patent No.: US 8,756,608 B2  
(45) Date of Patent: Jun. 17, 2014

(54) METHOD AND SYSTEM FOR PERFORMANCE ISOLATION IN VIRTUALIZED ENVIRONMENTS

(75) Inventors: Elmootazbellah N. Elnozahy, Austin, TX (US); Ramakrishnan Rajamony, Austin, TX (US); William E. Speight, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1182 days.

(21) Appl. No.: 12/495,842

(22) Filed: Jul. 1, 2009

(65) Prior Publication Data

US 2011/0004875 A1 Jan. 6, 2011

(51) Int. Cl.
| | | |
|---|---|---|
| *G06F 9/46* | (2006.01) | |
| *G06F 3/00* | (2006.01) | |
| *G06F 13/00* | (2006.01) | |
| *G06F 12/00* | (2006.01) | |
| *G06F 9/50* | (2006.01) | |

(52) U.S. Cl.  
CPC .............. *G06F 9/50* (2013.01); *G06F 9/5061* (2013.01); *G06F 9/5011* (2013.01); *G06F 9/5005* (2013.01); *G06F 13/00* (2013.01)  
USPC .............. 718/104; 718/100; 718/102; 710/1; 710/107; 710/240

(58) Field of Classification Search  
None  
See application file for complete search history.

(56) References Cited

U.S. PATENT DOCUMENTS

| 7,453,804 | B1 | 11/2008 | Feroz et al. | |
|---|---|---|---|---|
| 2002/0156824 | A1* | 10/2002 | Armstrong et al. | 709/104 |
| 2004/0003063 | A1* | 1/2004 | Ashok et al. | 709/221 |
| 2005/0165987 | A1* | 7/2005 | Asano et al. | 710/113 |

FOREIGN PATENT DOCUMENTS

| CN | 101266559 A | 9/2008 |
|---|---|---|
| EP | 0936615 A2 | 8/1999 |

OTHER PUBLICATIONS

Rogers P., Salla A., Sousa L.: "ABCs of z/Os System Programming vol. 10", IBM International Technical Support Organization (ITSO), Redbook Series, vol. SG24-6990-03 Sep. 30, 2008, pp. 329-367, XP002614316.  
Ravi Shah et al: "Sharing I/O in Strongly Partitioned Real-Time Systems", Jan. 1, 2005, Embedded Software Systems and Systems Lecture Notes in Computer Science; LNCS, Springer, Berlin, DE, pp. 502-507, XP019016692, ISBN: 978-3-540-28128-3.  
International Search Report, Dec. 15, 2010, PCT/EP2010/058884.

* cited by examiner

*Primary Examiner* — Abdullah Al Kawsar  
*Assistant Examiner* — Caroline H Arcos  
(74) *Attorney, Agent, or Firm* — Scully, Scott, Murphy & Presser, P.C.

(57) ABSTRACT

A method, a system, an apparatus, and a computer program product for allocating resources of one or more shared devices to one or more partitions of a virtualization environment within a data processing system. At least one user defined resource assignment is received for one or more devices associated with the data processing system. One or more registers, associated with the one or more partitions are dynamically set to execute the at least one resource assignment, whereby the at least one resource assignment enables a user defined quantitative measure (number and/or percentage) of devices to operate when the one or more transactions are executed via the partition. The system enables the one or more devices to execute one or more transactions at a bandwidth/capacity that is less than or equal to the user defined resource assignment and minimizes performance interference among partitions.

14 Claims, 4 Drawing Sheets

METHOD AND SYSTEM FOR PERFORMANCE ISOLATION IN VIRTUALIZED ENVIRONMENTS

BACKGROUND

1. Technical Field

The present invention generally relates to computer systems and in particular to virtualized environments within computer systems.

2. Background

In a virtualized environment, a layer of software called the hypervisor (also known as the virtual machine monitor) runs between the hardware and the operating system, and provides the appearance or illusion of multiple "virtual" machines (VM), also called partitions. A virtual machine is a virtual data-processing system that appears to have exclusive access of the machine's hardware, but whose functions are accomplished by sharing the hardware resources possibly among other virtual machines that co-exist in the machine. The hardware resources shared within the physical data-processing system include but are not limited to memory, processors, and input/output (I/O) devices.

Virtualized environments enable a plurality of operating systems to run concurrently on the same data-processing system, such that each virtual machine or partition runs exactly one instance of an operating system. Currently, the hypervisor allocates hardware resources such as processors, memory pages, and disks to one or more different partitions utilizing a virtual machine interface. The hypervisor allocates these resources to ensure the one or more partitions do not interfere with one another. Some resources, such as memory pages and CPU cores are allocated among different partitions so that there is no physical sharing of resources between partitions. Other resources, such as the memory bus, coherence bus, scalability ports or memory controllers, by nature cannot be allocated exclusively to any individual partition. The proliferation of multicore processor chips accentuates the problem of non-exclusive allocation. For example, there can be several partitions currently allocated to various cores on the same chip, each of the partitions effectively sharing the same data paths such as the aforementioned buses. Partitions sharing the same data path may suffer from severe performance interference when one partition runs a workload that saturates the shared resources, thereby starving other partitions. For instance, when a workload at the one or more partitions is heavily utilizing memory buses, coherence buses, scalability ports, and/or I/O buses, the performance of the other workloads running on different partitions are adversely affected.

BRIEF SUMMARY

Disclosed are an apparatus, a method, a system and a computer program product for allocating resources of one or more shared devices and/or data path capacities to one or more partitions of a virtualization environment within a data processing system. Each partition within the virtualization environment manages one or more user workloads. At least one user-defined resource assignment is received for one or more devices and/or data path capacities associated with the data processing system. The system manages one or more registers that are dynamically set to control the at least one resource assignment. The resource assignment enables a user defined quantitative measure (number and/or percentage) of devices and/or data path capacities to operate when the one or more workloads are executed via the partition. One or more partitions are enabled by the system to share the bandwidth and/or data path capacity of the devices. The workloads execute with a particular bandwidth and/or data path capacity of the devices that is less than or equal to the user defined resource assignment. The system isolates the workloads running on each partition; thereby minimizing unwanted interference among the one or more partitions.

The above as well as additional objectives, features, and advantages of the present invention will become apparent in the following detailed written description.

BRIEF DESCRIPTION OF THE SEVERAL VIEWS OF THE DRAWINGS

The invention itself, as well as advantages thereof, will best be understood by reference to the following detailed description of an illustrative embodiment when read in conjunction with the accompanying drawings, wherein.

DETAILED DESCRIPTION

The illustrative embodiments provide an apparatus, a method, a system and a computer program product for allocating resources of one or more shared devices and/or data path capacities to one or more partitions of a virtualization environment within a data processing system. Each partition within the virtualization environment manages one or more user workloads. At least one user-defined resource assignment is received for one or more devices and/or data path capacities associated with the data processing system. The system manages one or more registers that are dynamically set to control the at least one resource assignment. The resource assignment enables a user defined quantitative measure (number and/or percentage) of devices and/or data path capacities to operate when the one or more workloads are executed via the partition. One or more partitions are enabled by the system to share the bandwidth and/or data path capacity of the devices. The workloads execute with a particular bandwidth and/or data path capacity of the devices that is less than or equal to the user defined resource assignment. The system isolates the workloads running on each partition; thereby minimizing unwanted interference among the one or more partitions.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
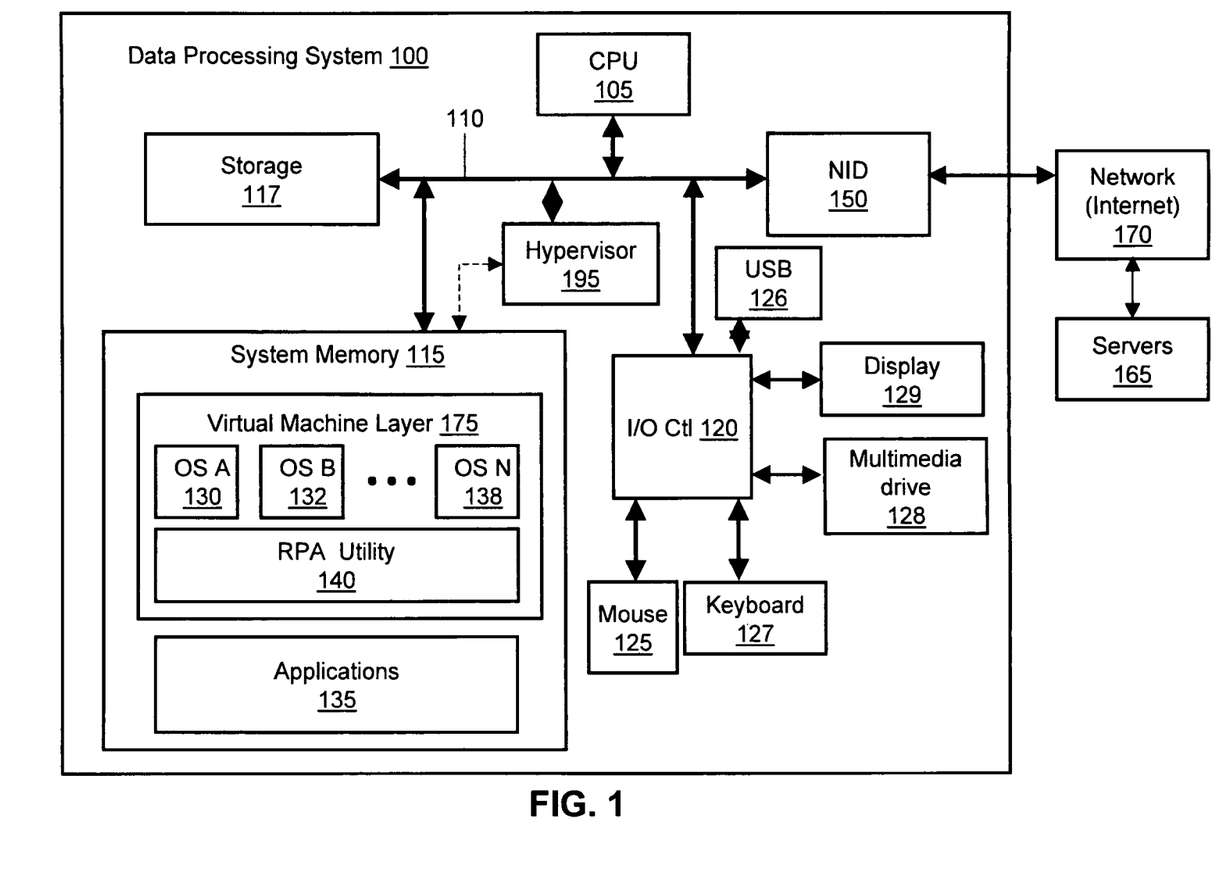
FIG. 1 provides a block diagram of a data processing system, within which various features of the invention may advantageously be implemented, according to one embodiment of the invention.

With reference now to the figures, and beginning with FIG. 1, there is depicted a block diagram representation of an example data processing system (DPS), as utilized within one embodiment. DPS may be a computer, a portable device, such as a personal digital assistant (PDA), a smart phone, and/or other types of electronic devices that may generally be considered processing devices. As illustrated, DPS 100 comprises at least one processor or central processing unit (CPU) 105 connected to system memory 115 via system interconnect/bus 110. Also connected to system bus 110 is input/output (I/O) controller 120, which provides connectivity and control for input devices, of which pointing device (or mouse) 125 and keyboard 127 are illustrated. I/O controller 120 also provides connectivity and control for output devices, of which display 129 is illustrated. Additionally, a multimedia drive 128 (e.g., compact disk read/write (CDRW) or digital video disk (DVD) drive) and USB (universal serial bus) port 126 are illustrated, coupled to I/O controller 120. Multimedia drive 128 and USB port 126 enable insertion of a removable storage device (e.g., optical disk or thumb drive) on which data/instructions/code may be stored and/or from which data/instructions/code may be retrieved. DPS 100 also comprises storage 117, within/from which data/instructions/code may also be stored/retrieved.

DPS 100 is also illustrated with a network interface device (NID) 150, by which DPS 100 may connect to one or more access/external networks 170, of which the Internet is provided as one example. In this implementation, the Internet represents/is a worldwide collection of networks and gateways that utilize the Transmission Control Protocol/Internet Protocol (TCP/IP) suite of protocols to communicate with one another. NID 150 may be configured to operate via wired wireless connection to an access point of the network. Network 170 may be an external network such as the Internet or wide area network (WAN), or an internal network such as an Ethernet (local area network—LAN) or a Virtual Private Network (VPN). Connection to the external network 170 may be established with one or more servers 165, which may also provide data/instructions/code for execution on DPS 100, in one embodiment.

In addition to the above described hardware components of DPS 100, various features of the invention are completed/supported via software (or firmware) code or logic. For example, hypervisor 195, is a computer software/hardware platform virtualization software that allows multiple operating systems to run on a host computer concurrently. Hypervisor 195 runs directly on the hardware of DPS 100 as a hardware control and guest operating system monitor and/or is a software application running within an operating system environment. Additionally, software (or firmware) code or logic is stored within system memory 115 or other storage (e.g., storage 117) and executed by CPU 105. Thus, for example, illustrated within system memory 115 are a number of software/firmware/logic components, including virtual machine layer 175 and applications 135. Within virtual machine layer 175 one or more operating systems are managed, for example operating system A (OS A) 130, OS B 132, and OS N 138 (wherby 'N' represents a finite number). Examples of possible operating systems are Microsoft Windows®, a trademark of Microsoft Corp, or GNU®/Linux®, registered trademarks of the Free Software Foundation and The Linux Mark Institute. Virtual machine layer 175 communicates with hypervisor 195 and/or is generated by hypervisor 195 to manage workloads of one or more partitions associated with hypervisor 195. Also within virtual machine layer 175 is resource priority assignment (RPA) utility 140 (which executes on CPU 105 to provide RPA logic). In actual implementation, RPA utility 140 may be combined with or incorporated into virtual machine layer 175 to provide a single executable component, collectively providing the various functions of each individual software component when the corresponding combined code is executed by the CPU 105. For simplicity, RPA utility 140 is illustrated and described as a stand alone or separate software/firmware component, which provides specific functions, as described below.

In one embodiment, servers 165 includes a software deploying server, and DPS 100 communicates with the software deploying server (165) via network (e.g., Internet 150) using network interface device 150. Then, the RPA utility 140 may be deployed from/on the network, via software deploying server 165. With this configuration, software deploying server performs all of the functions associated with the execution of RPA utility 140. Accordingly, DPS 100 is not required to utilize internal computing resources of DPS 100 to execute RPA utility 140.

CPU 105 executes RPA utility 140 as well as OS A 130, OS B 132, and OS N 138 which supports the user interface features of RPA utility 140. In the described embodiment, RPA utility 140 generates/provides several graphical user interfaces (GUI) to enable user interaction with, or manipulation of, the functional features of RPA utility 140. Certain functions supported and/or implemented by RPA utility generate processing logic executed by processor and/or device hardware to complete the implementation of that function. For simplicity of the description, the collective body of code that enables these various features is referred to herein as RPA utility 140. Among the software code/instructions/logic provided by RPA utility 140, and which are specific to the invention, are: (a) code/logic for receiving at least one resource assignment for one or more devices; (b) code/logic for associating the at least one resource assignment with the one or more partitions; and (c) code/logic for enabling the one or more devices to execute one or more transactions at a capacity that is less than or equal to the at least one resource assignment in response to receiving the at least one resource assignment. According to the illustrative embodiment, when CPU 105 executes RPA utility 140, DPS 100 initiates a series of functional processes that enable the above functional features as well as additional features/functionality. These features and functionality are described in greater detail below within the description of FIGS. 2-4.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
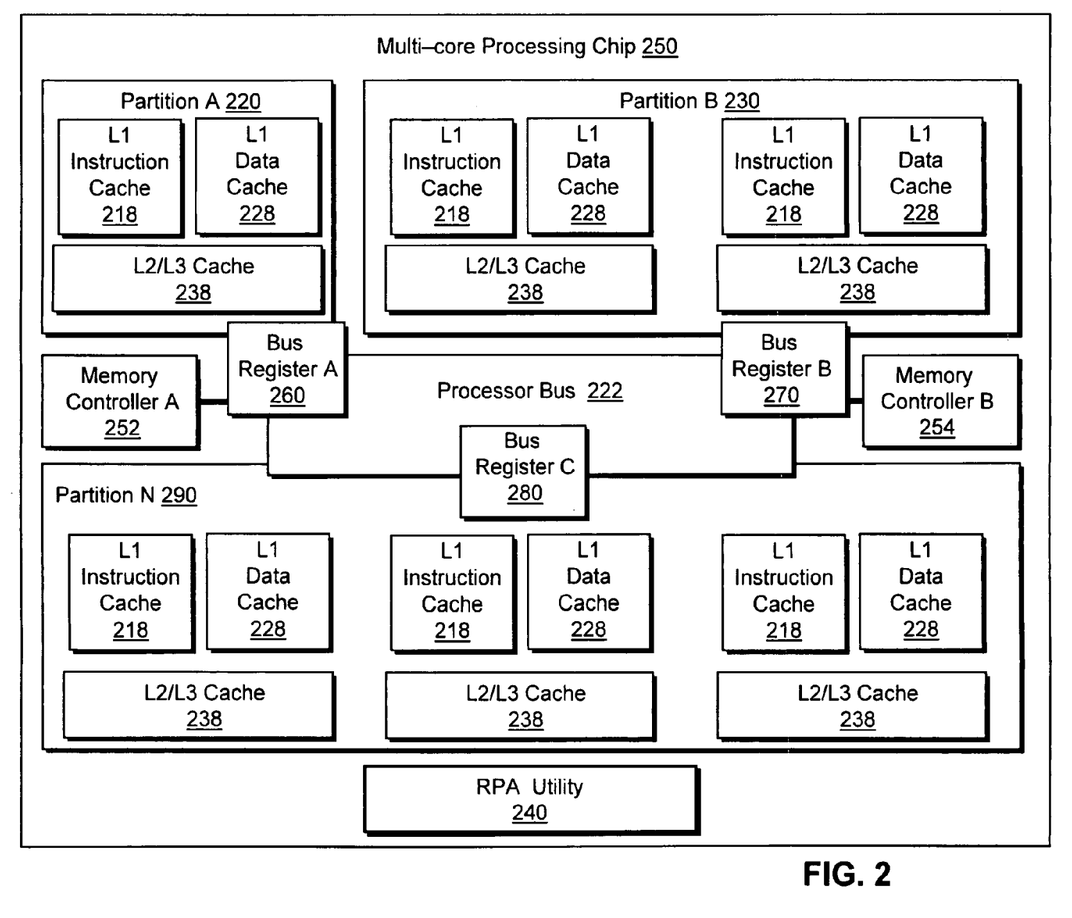
FIG. 2 is a diagram of a multiple core processing chip divided into one or more partitions, in accordance with one embodiment of the invention.

With reference now to FIG. 2, there is depicted a multiple core processing chip by which one or more partitions are executed within a virtual environment. Multi-core processing chip 250 includes partition A 220, partition B 230 and partition N 290 (whereby 'N" represents a finite number). Also included in multi-core processing chip 250 are RPA utility 240, processor bus 222, memory controller A 252, memory controller B 254, bus register A 260, bus register B 270, and bus register C 280. Partition A 220 includes L1 instruction cache 218, L1 data cache 228, and L2/L3 cache 238. A second partition on multi-core chip 250 contains two L1 instruction caches 218, two L1 data caches 228, and two L2/L3 caches 238. Partition N 290 (whereby 'N' is a finite number) represents a 'N$^{th}$' number of partitions within multi-core processing chip 250. Partition N includes one or more (illustrated as three) L1 instruction caches 218, one or more L1 data caches 228, and one or more L2/L3 caches 238. Bus register A 260 is a means of communication between partition A 220 and processor bus 222. Bus register B 270 enables communication between partition B 230 and processor bus 222, and partition N 290 communicates with processor bus 222 via bus register C 280.

In one embodiment, one or more hardware mechanisms of the system enable execution of one or more resource assignments. RPA utility 240 includes the logic that throttles access to the shared system resources. RPA utility 240 receives one or more assignments for allocating system resources to one or more partitions. Partitions, such as partition A 220, partition B 230, and partition N 290, are logical units of isolation that are supported by virtual machine layer 175 (depicted in FIG. 1), whereby one or more operating systems are executed. Partition A 220, partition B 230, and partition N 290 are associated with bus register A 260, bus register B 270, and bus register N 280, respectively. Additionally, partition A 220, partition B 230, and partition N 290 are associated with one or more hardware buses. When one or more partitions receive an allocation of resources, the respective bus register (bus register A 260, bus register B 270, and/or bus register N 280) is set according to the received resource assignment.

When one or more operating system transactions are executed in association with a partition, the respective bus register (bus register A 260, bus register B 270, and bus register N 280) implements the requested assignment. For example, RPA utility 240 receives a user-defined (or default) assignment to cap resource usage supporting partition A 220 at a capacity of 20%. To implement the assignment, for every 100 bus cycles no more than 20 accesses (transactions) are allowed by bus register A 260 (to access the shared resources). The resource allowance is relaxed when processor bus 222 is not busy (i.e. when there are no pending requests from other partitions). In this case, the number of accesses allowed by bus register A 260 may be increased on a best effort basis. The resource assignment enables a user defined quantitative measure of accesses to processor bus 222 when the one or more transactions are executed.

In one embodiment, when the register is assigned a number of accesses, the register is decremented every time the partition accesses the bus. In an instance in which bus register A 260 is assigned a count of 20, the count of bus register A 260 is reset to 20 for every 100 bus cycles completed. The count of bus register A 260 reaches zero when partition A 220 has consumed the allotted quota (number of assigned accesses) to processor bus 222. Further accesses to processor bus 222 by partition A 220 are allowed only when there is no pending transaction to access the bus from another partition, whereby the partition has not consumed the user defined resource assignment (i.e. consumed the assigned number/capacity of accesses to processor bus 222).

In another embodiment, one or more operating systems are associated with partition A 220, partition B 230, and partition N 290. Bus register A 260, bus register B 270, bus register N 280, and/or one or more other registers are associated with partition A 220, partition B 230, and partition N 290. Bus register A 260, bus register B 270, bus register N 280, and/or one or more other registers receives one or more resource assignments via RPA utility 240 (and/or one or more operating systems). The resource assignments are implemented via one or more bus register A 260, bus register B 270, and/or bus register N 280.

In one embodiment, a bus register B 270 may be implemented by a plurality of registers, each of which controls the access of a particular processor core to the bus. With reference to FIG. 2, partition B 230 is shown to use four processor cores with two L2/L3 caches 238. In one embodiment, bus register B 270 may be implemented via two physical registers, each gating the access of one L2/L3 cache (238) to bus 222. Bus register A 260, bus register B 270, bus register N 280, and/or one or more other registers communicate with processor bus 222 to ensure that accounting of the bus accesses for partition B 230 is done properly. For example, an access by one of L2/L3 cache (238) to the processor bus 222 will cause the quota count to be decremented simultaneously at both registers. Such an implementation is incorporated into the cache design of L2/L3 cache 238.

In another embodiment, the hypervisor (similar to hypervisor 195 of FIG. 1) allows preemption of partitions to maximize hardware utilization. Bus register A 260 becomes a part of the software context of partition A 220. Similarly, bus register A 260 becomes a part of the software context of register B 270 for partition B 230, and register N 280 for partition N 290). The hypervisor must store and restore the values of bus register A 260, bus register B 270, and/or bus register N 280 when the corresponding partition (e.g. partition A 220, partition B 230, and partition N 290) is deallocated or reallocated, respectively.

In another embodiment, the hypervisor allows preemption of partitions to maximize hardware utilization. Upon swapping (e.g. allow allocation of more resources, such as RAM, than a system (e.g. server) physically has available) in the partition, the hypervisor reinitializes the bus register to the corresponding user-defined value.

Figure 3:
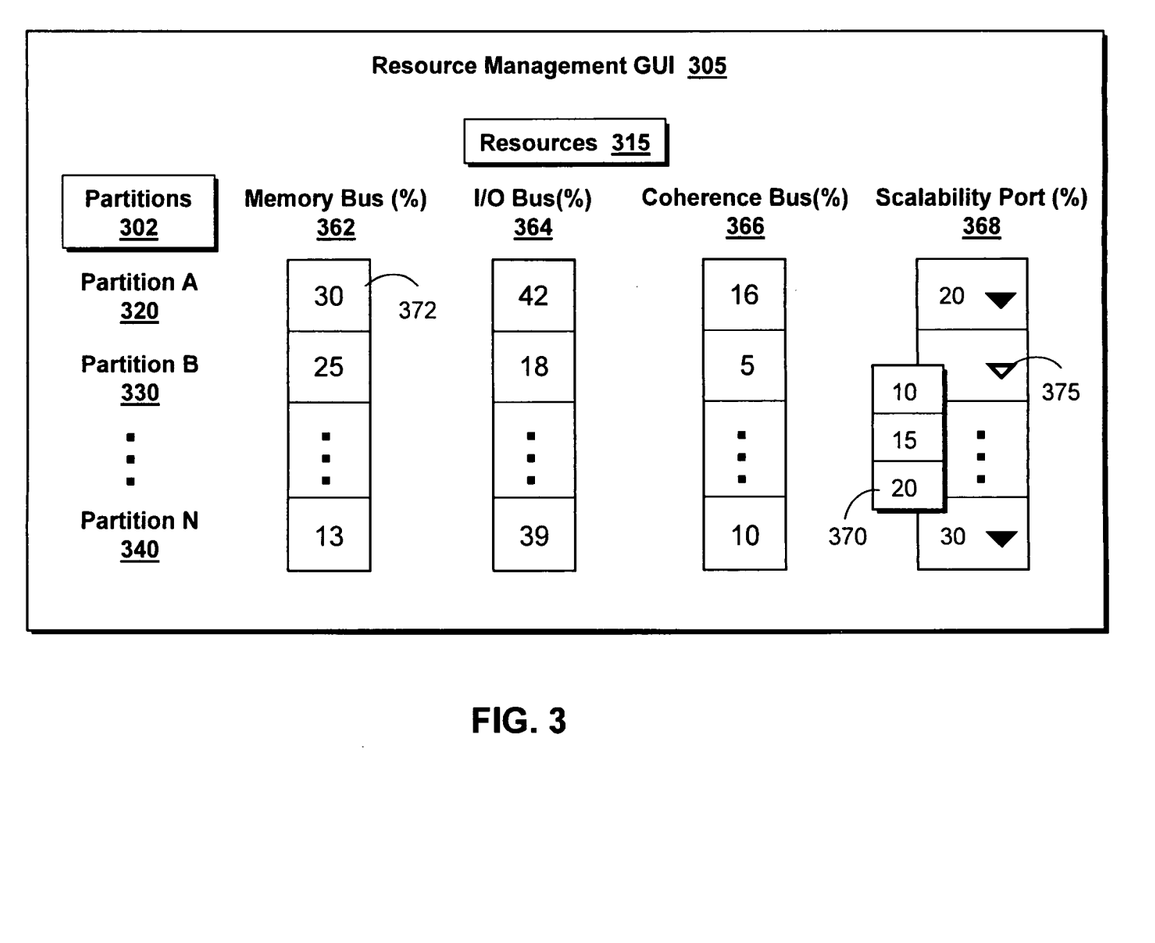
FIG. 3 illustrates an example resource management graphical user interface displaying user defined resource assignments for one or more partitions in a virtualization environment, according to one embodiment of the invention.

FIG. 3 depicts a resource management graphical user interface (GUI). Resource management GUI 305 contains a category of one or more resources, resources 315, a listing of partitions, partitions 302, resource assignment 372, available measures 370, and drop down menu selection 375. Resources 315 includes, but are not limited to: memory bus 362, I/O bus 364, coherence bus 366, and scalability port 368. Partitions 302 include, but are not limited to partition A 320, partition B 330, and partition N 340 (whereby 'N' is a finite number).

In one embodiment, at least one resource assignment is associated with one or more devices, or resources. Partition A 320, partition B 330, and partition N 340 are associated with a virtual environment, and the partition listing is output to resource management GUI 305. The listing of partitions is dynamically updated when a partition is modified (added or subtracted from the virtual environment). Resources 315, such as memory bus 362, I/O bus 364, coherence bus 366, and scalability port 368 are associated with each partition. Resources associated with partitions are predefined and/or user defined. When one or more resources (315) are added and/or subtracted from the data processing system (100 of FIG. 1), resource management GUI 305 is dynamically updated.

In another embodiment, at least one resource assignment is received for one or more devices. Resource assignment 372, available measures 370, and drop down menu selection 375 of resource management GUI 305 enable one or more user defined and/or predefined inputs to be received by RPA utility 140 (of FIG. 1). For example, resource assignment 372 is a quantitative measurement input that may include, but is not limited to, a percentage of device bandwidth and/or number of devices to be utilized during execution of one or more transactions. Available measures 370 depicts predefined or default quantitative measures (associated with the respective resource and partition) to be selected, or measures that are automatically selected. When drop down menu selection 375 is selected, available measures 370 is displayed. Resources 315, partitions 302 and available measures 370 are dynamically updated when one or more modifications are detected and/or received within the data processing system.

In one embodiment, when the at least one resource assignment is received, one or more devices are enabled to execute one or more transactions at a capacity that is less than or equal to the at least one resource assignment. Resource management GUI 305 receives a user defined allocation of resources (resource assignment) for the one or more devices (resources 315). For example memory bus 362 operates at or below thirty percent (30%) for partition A 320, and memory bus 362 operates at twenty five percent (25%) for partition B 330 during one or more transactions. When resource management GUI 305 receives the user defined input for resource assignment 372, one or more registers dynamically adjust to execute the user defined allocation of resources. The execution of user defined allocation of resources enables the specified device (resource) to operate at the user defined capacity (bandwidth) for the associated partition. Resource management GUI 305 is directly associated with virtual machine layer 175 (of FIG. 1). Virtual machine layer 175 controls/manages/provides access to the registers (associated with partitions 302), as specified by values inputted within resource management GUI 305.

Figure 4:
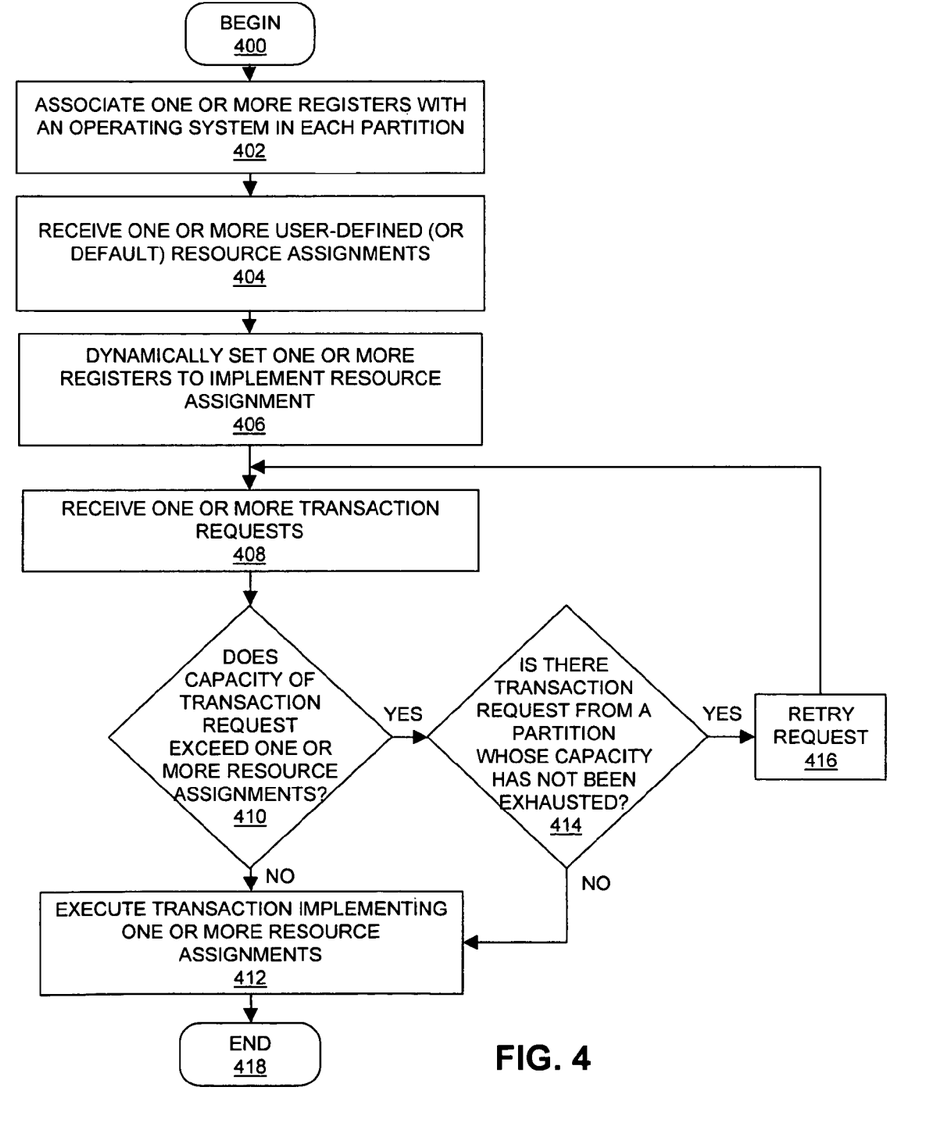
FIG. 4 is a flow chart illustrating the processes for executing a transaction to implement one or more resource assignments, according to one embodiment of the invention.

FIG. 4 is a flow chart illustrating methods by which the above processes of the illustrative embodiments are completed. Although the methods illustrated in FIG. 4 may be described with reference to components shown in FIGS. 1-3, it should be understood that this is merely for convenience and alternative components and/or configurations thereof can be employed when implementing the various methods. Key portions of the methods may be completed by RPA utility 140 executing on processor 105 within DPS 100 (FIG. 1) and controlling specific operations of/on DPS 100, and the methods are thus described from the perspective of both RPA utility 140 and DPS 100.

FIG. 4 illustrates the processes for executing one or more transactions request when one or more resource assignments are received. The process of FIG. 4 begins at initiator block 400 and proceeds to block 402, at which one or more registers are associated with an operating system in each partition. One or more user defined (or default) resource assignments are received for each partition, at block 404. At block 406, one or more registers are dynamically set to implement the resource assignment(s). One or more transaction requests are received at block 408.

A decision is made, at block 410, whether the bandwidth/capacity required for the transaction request exceeds one or more preset resource assignments (or allocations). If the bandwidth/capacity for the transaction request exceeds the one or more resource assignments the process continues to block 414. The process continues to block 412 if the bandwidth/capacity for the transaction request does not exceed the one or more resource assignments. At block 414 a decision is made whether to there is a transaction request from a partition whose capacity has not been exhausted. When there is a transaction request from a partition whose capacity has not been exhausted the process continues to block 416. The request is resubmitted, at block 416, and the process continues to block 408. If there is not a transaction request from a partition whose capacity has not been exhausted the process continues to block 412. The transaction is executed at block 412, implementing the one or more resource assignments. The process ends at block 418.

In the flow chart above, one or more of the methods are embodied in a computer readable storage medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processing system having at least one processor and a virtualization layer, a method for allocating resources of one or more shared devices shared by one or more partitions of a virtualization environment within the data processing system, the method comprising:

associating one or more registers with an operating system in the one or more partitions;

receiving at least one user-defined resource assignment for one or more of the one or more shared devices;

associating the at least one resource assignment with the one or more partitions;

associating an access count with the one or more registers, a register of the one or more registers associated with one partition different from other partitions of the one or more partitions dynamically enabling the one or more registers to implement the at least one resource assignment in accordance with the access count, wherein the at least one resource assignment comprises a pre-defined quantitative measure of the one or more shared devices use when one or more transaction requests are executed within the one or more partitions;

based on the at least one resource assignment received, enabling the one or more shared devices to execute the one or more transaction requests within the one or more partitions at a capacity less than or equal to the at least one resource assignment;

decrementing the access count of each of the one or more registers each time the one or more registers executes a transaction requests via a processor bus, wherein the processor bus enables access to the one or more shared devices;

checking the access count of the one or more registers;

transmitting the transaction request to the processor bus when the access count is not zero;

blocking access to the processor bus if the access count is zero;

retrying the transaction requests in a future bus cycle; and when the access count has reached zero, allowing the transaction requests to proceed with access to the processor bus only when there are no pending accesses to the processor bus from other partitions whose access count is greater than zero.

2. The method of claim 1, further comprising:

associating one or more operating systems with the one or more partitions;

storing the at least one resource assignment within one or more registers;

and executing the resource assignments via one or more registers, wherein the one more resource assignments manages the use of the one or more shared devices.

3. The method of claim 1, further comprising:

associating the pre-defined quantitative measure of device use with one of:

a bandwidth capacity of one or more shared devices; and a number of one or more shared devices.

4. The method of claim 1, further comprising:

receiving the at least one resource assignment at a graphical user interface; and associating one or more of the at least one received resource assignments with usage of one or more shared devices associated with the one or more partitions.

5. The method of claim 4, further comprising:

dynamically updating a listing of partitions when a partition is modified; and when the one or more resources of the one or more shared devices are one of added and subtracted, dynamically updating the graphical user interface.

6. A computer program product comprising:

a computer readable medium which is not a propagating signal; and program code on the computer readable medium that when executed by a processor provides the functions of:

associating one or more registers with an operating system in one or more partitions;

receiving at least one user-defined resource assignment for one or more devices shared by one or more partitions;

associating the at least one resource assignment with the one or more partitions;

associating an access count with the one or more registers, a register of the one or more registers associated with one partition different from other partitions of the one or more partitions;

dynamically enabling the one or more registers to implement the at least one resource assignment in accordance with the access count, wherein at least one resource assignment comprises a pre-defined quantitative measure of the one or more shared devices use when the one or transaction requests are executed within the one or more partitions;

based on the at least one resource assignment received, enabling the one or more shared devices to execute the one or more transaction requests within the one or more partitions at a capacity less than or equal to the at least one resource assignment;

decrementing the access count of each of the one or more registers each time the one or more registers executes one of the transaction requests via a processor bus, wherein the processor bus enables access to the one or more shared devices;

checking the access count of the one or more registers;

transmitting the transaction request to the processor bus when the access count is not zero;

blocking access to the processor bus if the access count is zero;

retrying the transaction requests in a future bus cycle; and when the access count has reached zero, allowing the transaction requests to proceed with access to the processor bus only when there are no pending accesses to the processor bus from other partitions whose access count is greater than zero.

7. The computer program product of claim 6, further comprising program code for:

associating one or more operating systems with the one or more partitions;

storing the at least one resource assignment within one or more registers; and executing the resource assignments via one or more registers, wherein the one more resource assignments manages the use of the one or more shared devices.

8. The computer program product of claim 6, further comprising program code for:

associating the pre-defined quantitative measure of device use with one of:

a bandwidth capacity of one or more shared devices; and a number of one or more shared devices.

9. The computer program product of claim 6, further comprising program code for:

receiving the at least one resource assignment at a graphical user interface; and associating one or more of the at least one received resource assignments with usage of one or more shared devices associated with the one or more partitions.

10. The computer program product of claim 9, further comprising program code for:

dynamically updating a listing of partitions when a partition is modified; and when the one or more resources of the one or more shared devices are one of added and subtracted, dynamically updating the graphical user interface.

11. A computer system comprising:

a processor; and a utility executing on the processor and which comprises code that enables completion of the following functions:

associating one or more registers with an operating system in one or more partitions;

receiving at least one user-defined resource assignment for one or more of the one or more shared devices;

associating the at least one resource assignment with the one or more partitions;

associating an access count with the one or more registers, a register of the one or more registers associated with one partition different from other partitions of the one or more partitions dynamically enabling the one or more registers to implement the at least one resource assignment in accordance with the access count, wherein the at least one resource assignment comprises a pre-defined quantitative measure of the one or more shared devices use when one or more transaction requests are executed within the one or more partitions;

based on the at least one resource assignment received, enabling the one or more shared devices to execute the one or more transaction requests within the one or more partitions at a capacity less than or equal to the at least one resource assignment;

decrementing the access count of each of the one or more registers each time the one or more registers executes one of the transaction requests via a processor bus, wherein the processor bus enables access to the one or more shared devices;

checking the access count of the one or more registers;

transmitting the transaction request to the processor bus when the access count is not zero;

blocking access to the processor bus if the access count is zero;

retrying the transaction requests in a future bus cycle; and when the access count has reached zero, allowing the transaction requests to proceed with access to the processor bus only when there are no pending accesses to the processor bus from other partitions whose access count is greater than zero.

12. The computer system of claim 11, said utility further comprising code for:

associating one or more operating systems with the one or more partitions;

storing the at least one resource assignment within one or more registers; and executing the resource assignments via one or more registers, wherein the one more resource assignments manages the use of the one or more shared devices.

13. The computer system of claim 11, said utility further comprising code for:

associating the pre-defined quantitative measure of device use with one of:

a bandwidth capacity of one or more shared devices; and a number of one or more shared devices.

14. The computer system of claim 11, said utility further comprising code for:

receiving the at least one resource assignment at a graphical user interface;

associating one or more of the at least one received resource assignments with usage of one or more shared devices associated with the one or more partitions;

dynamically updating a listing of partitions when a partition is modified; and when the one or more resources of the one or more shared devices are one of added and subtracted, dynamically updating the graphical user interface.

* * * * *